Nov. 7, 1939.　　　　E. H. PIRON　　　　2,178,643
TRACK BRAKE SUSPENSION
Filed Aug. 21, 1935
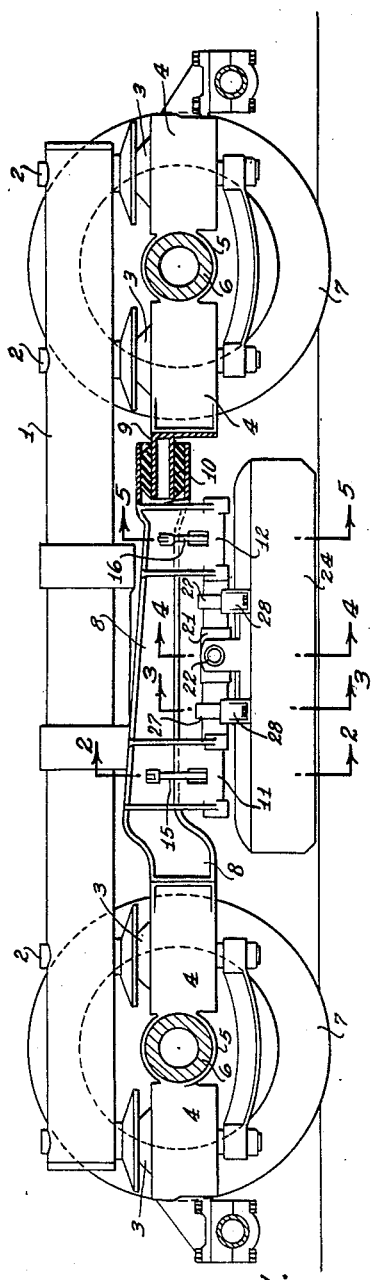
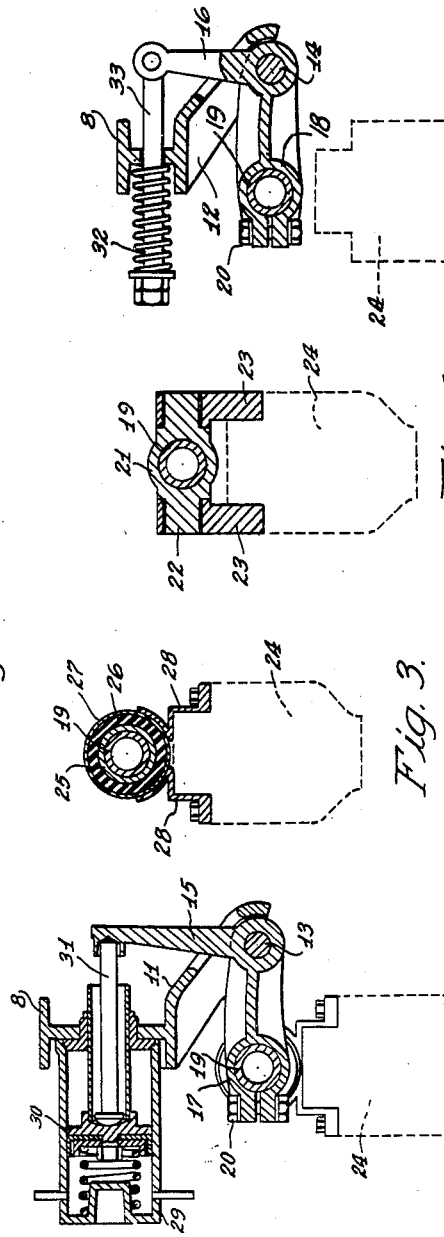
INVENTOR.
Emil H. Piron
BY
ATTORNEY.

Patented Nov. 7, 1939

2,178,643

UNITED STATES PATENT OFFICE 2,178,643

TRACK BRAKE SUSPENSION

Emil H. Piron, New York, N. Y., assignor, by mesne assignments, to Transit Research Corporation, New York, N. Y., a corporation of New York Application August 21, 1935, Serial No. 37,109

14 Claims. (Cl. 188—41)

This invention relates to magnetic track brakes for rail vehicles and has for its object to provide an improved suspension means for the brake shoe thereof.

A specific object is to provide a suspension such that the braking forces will be resisted by shearing action against two sturdy pins, the arms which transmit the forces to these pins being subject to compression and tension as distinguished from bending.

Another object is to provide a suspension means in which the friction is reduced to a small amount whereby the amount of elevation of the shoes from the track will be in accurate response to the lifting forces and whereby the shoe can be lowered either horizontally or according to an exact predetermined angle as may be desired for reliable and efficient operation.

Due to severe impacts received by track shoes during normal operation the suspension means may become "sprung" or distorted in such manner that proper surface contact between the shoe and the rail is not obtained. It is therefore a further object to provide an articulated connection between a brake shoe and the suspension arms whereby the shoe can find its proper surface contact with a rail and to oppose free rocking of the shoe at this connection by a yielding means sufficiently stiff to prevent looseness and rattling but sufficiently resilient to provide proper contact without distortion of the supporting mechanism.

Other objects and advantages will become hereinafter more fully apparent as reference is had to the accompanying drawing wherein my invention is illustrated by way of example and in which Figure 1 is a side elevation of a truck frame taken from within the truck, Figures 2, 3, 4 and 5 are vertical sections taken along the lines 2—2, 3—3, 4—4 and 5—5 respectively.

1 indicates a side rail having spring members 2 depending therefrom for insertion through cylinders 3 of rubber. Encircling each cylinder 3 are the external cylindrical spring supports 4 having journals 5 fixedly carried between each pair thereof. Axles 6 are journalled in the bearings 5 for support by the wheels 7. Connecting one support 4 of each pair of spring assemblies 2, 3, 4 is a torque arm 8, 9 the two parts of which are of unequal length and joined by an elastic universal connection 10. The other side of the truck is the same as just described except that the relative positions of the arms 8 and 9 are reversed, as in those shown and described in my co-pending application Serial Number 24,190, filed May 31, 1935. The spring supports 4 and torque arms 8 and 9 on the two sides of the truck, together with their connecting members, form a sub-frame whose distance from the rails is substantially fixed.

Fixed to or integral with the longer arm 8 on each side of the truck are bracket hangers 11 and 12 each having pins 13 and 14 carried thereby, with the pins being parallel with each other and preferably co-axial. Journalled on said pins 13 and 14 are bell cranks 15 and 16 respectively and at the lower end of said bell cranks are clamp openings 17 and 18 adapted to receive the ends of a shaft or tube 19. The bolts 20 tighten the clamp openings 17 and 18 about the tube 19.

Intermediate the length of the tube 19 is a sleeve 21 freely rotatable thereon and having trunnions 22 integral therewith. These trunnions are received by bracket members 23 fixedly secured to and projecting upwardly from a track brake shoe 24. Between the sleeve 21 and each of the clamps 18 and 17 are short sleeves 25 in frictional engagement, or maintained against rotation by friction, with the tube 19. A rubber cylinder 26 surrounds each sleeve 25 and a further cylinder 27 encircles each rubber cylinder. Arising from the upper surface of the shoe 24 are additional brackets 28 for frictional engagement with the sleeves 27. The electrical parts of the shoe 24 are not related to the present invention and hence are not shown in the drawing. The construction of a track brake shoe is old and well known.

It will be seen from the foregoing that the shoe 24 may be raised and lowered through the arc of a circle since the pins 13 and 14 are fixed. It will also be seen that the shoe 24 may rock fore and aft and laterally with all movements thereof relative to the tube 19 being resisted by the rubber cylinders 26, and according to the frictional contacts provided.

When the shoe is lowered to the rail and braking is being accomplished, the lower arm of one bell crank member 15 or 16 is subject to tension and the other to compression with the pins 13 and 14 resisting the tension and compression in shear.

For raising and lowering the shoe 24 with the structure afore described, a number of mechanisms and devices may be found suitable. I have found it satisfactory to place an air cylinder 29 on the arm 8, the piston 30 of which has a piston rod 31 for engagement with the arm 15. Upon introducing compressed air from any suitable source into the cylinder 29 the shoe 24 is elevated and retained in raised position until it is desired to lower the shoe whereupon the air is released. Pivotally secured to the upper arm of the other bell crank 16 is a rod 33 for engagement with a suitable spring 32 abutting the arm 8. This spring 32 urges the shoe downwardly toward its rail and will therefore lend rapidity to the lowering of the shoe upon release of air from the cylinder 29.

What I claim is:

1. The combination of a track brake shoe, means for supporting said shoe from a point immediately above the center of gravity thereof, a swivel connection in said supporting means, and means for yieldingly opposing the swivelling of said shoe about said swivel connection.

2. The combination of a track brake shoe and a supporting structure for said shoe comprising laterally spaced rigid arms both pivoted to swing about fixed bearing members, said brake shoe being carried by said arms, and a universal connection between said arms and said shoe.

3. A supporting structure for a track brake shoe comprising spaced arms having co-axial journal bearings at one end and a universal connection at their other end for connection to a track brake shoe, said arms being adapted to swing through the arc of a circle with said bearings as the center thereof in raising and lowering said shoe to the track.

4. A supporting structure for a track brake shoe comprising spaced arms having co-axial journal bearings at one end, a rigid member joining the other ends of said arms, and a universal connection intermediate the ends of said rigid member for rockably supporting said brake shoe therefrom.

5. A supporting structure for a track brake shoe comprising spaced arms having co-axial bearings at one end, a rigid member connecting the other ends of said arms, a sleeve carried by said rigid member in rotative engagement therewith, and trunnions projecting from said sleeve for rockably supporting a brake shoe.

6. In a rail truck, the combination of a track brake having a shoe adapted to be lowered into contact with a rail, and means for supporting said shoe comprising spaced arms hingedly attached at one end to the frame of the truck with the hinges parallel to said rail and attached at the other end to said brake shoe for lowering and raising the same through an arc of a circle transverse to the direction of travel of said truck.

7. In a rail truck, the combination of a track brake having a brake shoe adapted to be lowered into contact with a rail, and means for supporting said shoe comprising spaced arms each hingedly attached at one end to the frame of the truck with the hinges thereof parallel with said rail and pivotally attached at the other end to said shoe for raising and lowering the same through the arc of a circle transverse to the direction of travel of the truck.

8. The combination of a track brake shoe, a supporting structure, pneumatic means associated with said structure for holding said shoe suspended above the track, and a universal connection between said supporting structure and said shoe for allowing swivelling motion thereof in finding maximum contact with said track.

9. The combination of a track brake shoe, a supporting structure, pneumatic means for raising said supporting structure, spring means for depressing said structure, and a universal connection between said structure and said shoe whereby said shoe may swivel with respect to said structure in finding maximum rail contact.

10. The combination of a track brake shoe, means for supporting said shoe above the track, a hinge connection between said means and said shoe with its hinge transversely of said track, and resilient means for yieldingly opposing the rocking of said shoe on its hinge.

11. The combination of a track brake shoe, means for supporting said shoe above the track, a hinge connection between said means and said shoe with its hinge parallel with said track, and resilient means for yieldingly opposing the rocking of said shoe on said hinge.

12. The combination of a track brake shoe, means for supporting said shoe above the track, a universal connection between said means and said shoe, and elastic pads between said shoe and said means for yieldingly resisting swivelling movement of said shoe in finding contact with the track.

13. In a track brake mechanism, parallel spaced arms having co-axial fixed journal bearings at one end, a rigid member connecting said arms at their other ends, a sleeve rotatable on said member and having trunnions projecting therefrom for normal position transverse to the track, a brake shoe journalled on said trunnions, elastic pads fore and aft of said trunnions residing between said member and said shoe for opposing rocking movement thereon, and means for swinging said arms up and down about their bearings whereby said shoe is raised and lowered with respect to said track.

14. A supporting structure for an elongated track brake shoe comprising spaced two-arm levers extending outwardly transverse to said shoe and having coaxial supporting bearings, and resilient means for attachment of one-arm of each of said levers to said brake shoe.

EMIL H. PIRON.